United States Patent [19]

Tennes et al.

[11] 4,320,995

[45] Mar. 23, 1982

[54] VACUUM-OPERATED PRODUCE HANDLING SYSTEMS

[75] Inventors: Bernard R. Tennes, Charlotte; Richard J. Wolthuis, Haslett; Clyde L. Burton, East Lansing, all of Mich.

[73] Assignee: The United States of America as represented by the Secretary of Agriculture, Washington, D.C.

[21] Appl. No.: 132,583

[22] Filed: Mar. 21, 1980

[51] Int. Cl.³ ............... B65G 53/30; B65G 53/40
[52] U.S. Cl. ............... 406/39; 56/328 R; 406/106; 406/122; 406/136
[58] Field of Search ........... 406/39, 41, 48, 106, 406/122, 136, 137; 56/328 R, 13.3; 417/148; 137/205; 134/154, 182; 366/174; 37/58, 72, 195, DIG. 8

[56] References Cited

U.S. PATENT DOCUMENTS

| | | | |
|---|---|---|---|
| 3,522,696 | 8/1970 | Millier et al. | 56/328 R |
| 3,815,267 | 6/1974 | Laarman | 37/58 |
| 3,918,116 | 11/1975 | Valdespino | 15/3.13 |
| 4,064,683 | 12/1977 | Tennes et al. | 56/328 TS |

FOREIGN PATENT DOCUMENTS 2011547  7/1979  United Kingdom ......... 417/148

*Primary Examiner*—Jeffrey V. Nase
*Attorney, Agent, or Firm*—M. Howard Silverstein; David G. McConnell; Curtis P. Ribando

[57] ABSTRACT

A novel flume hopper is employed in combination with a vacuum-operated hydraulic conveyor in a field or storage handling system for efficiently transferring produce to a holding tank without inflicting damage.

4 Claims, 5 Drawing Figures

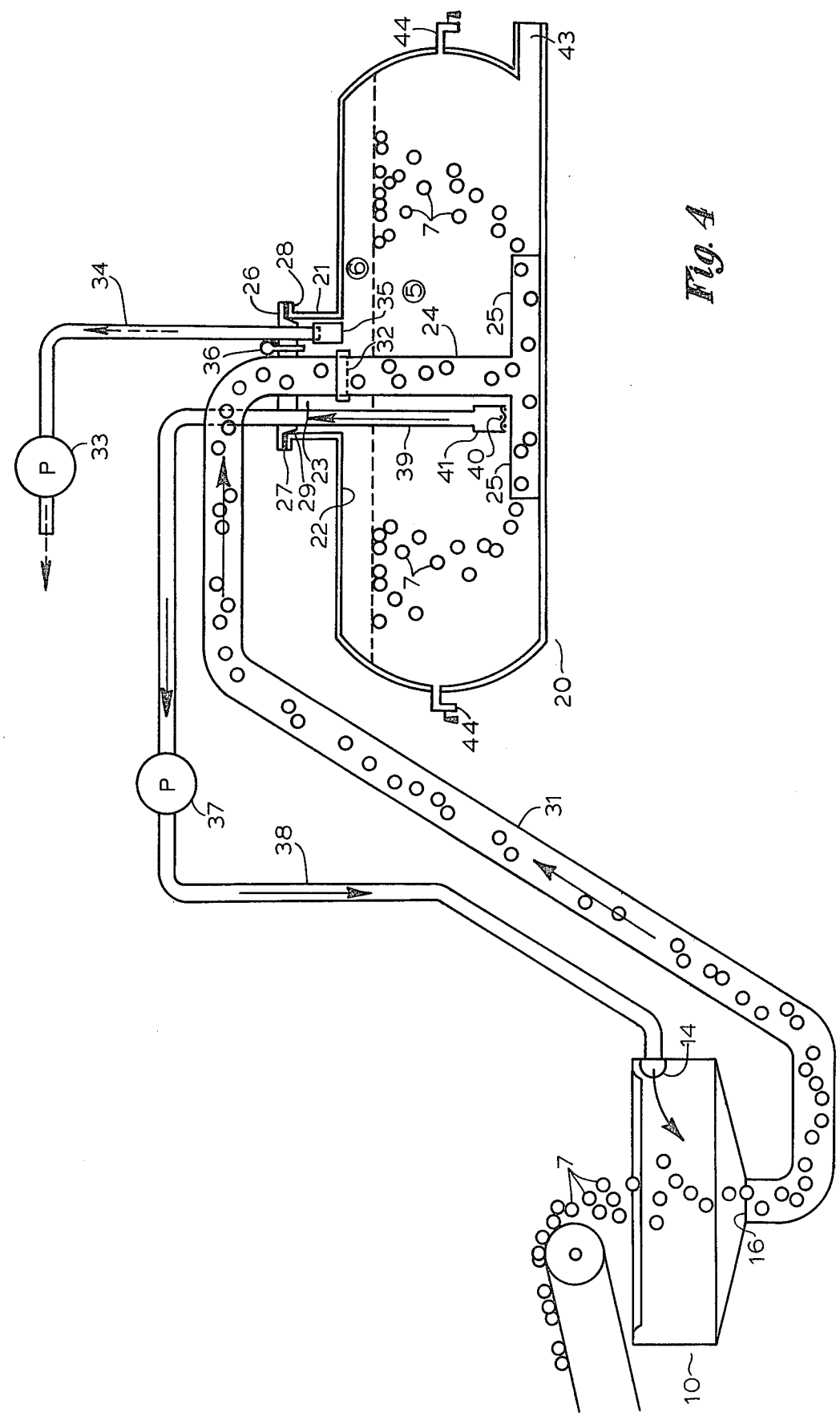

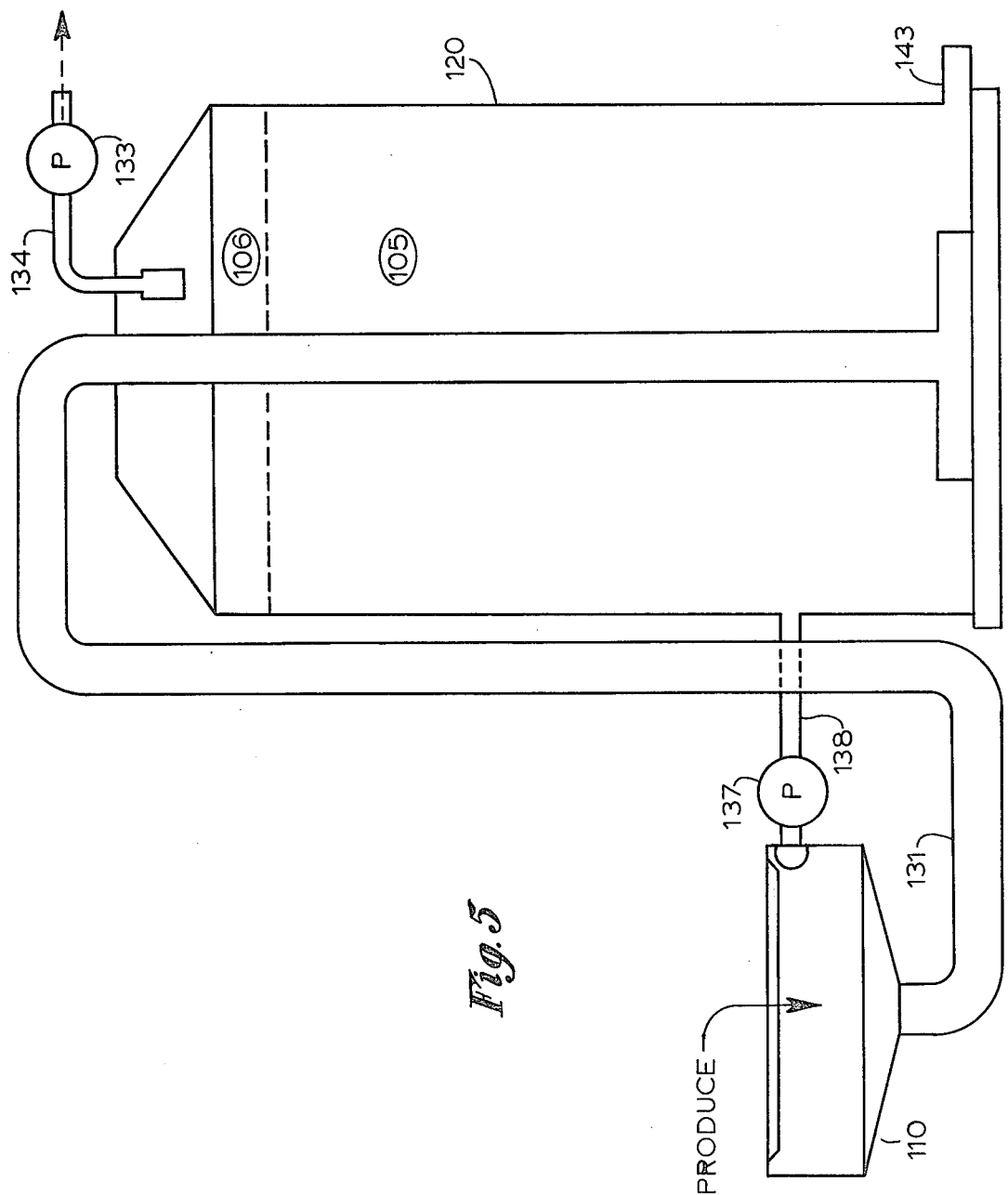

VACUUM-OPERATED PRODUCE HANDLING SYSTEMS

BACKGROUND OF THE INVENTION

1. Field of the Invention

This invention relates to the handling of fruits and vegetables during and after field harvesting. With the current trend toward the mechanized harvesting of certain produce, it has become necessary to place special emphasis on preserving its market quality. The picked produce is conventionally collected in pallet boxes which are forklifted out of the field and eventually emptied into bulk bins for storage. With each transfer, additional bruising is incurred, and the overall produce quality is reduced. Other disadvantages of this type of handling system include the difficulty of maneuvering pallet boxes between closely spaced rows, as well as the expenditure of considerable time and energy in shuttling the boxes to and from the field.

2. Description of the Prior Art

A partial solution to the bruising problem of mechanically harvested fruit is taught by Millier et al. in U.S. Pat. No. 3,522,696. The falling fruit is first decelerated by a webbed catch frame and is then conveyed to a water tank until it can be collected and removed by some undisclosed means. A similar arrangement is contemplated by Tennes et al., U.S. Pat. No. 4,064,683, wherein the fruit collected by the catch frames is conveyed upwardly by a series of belts to a flume hopper. The hopper is continuously flushed with water or other liquid medium and the fruit is thereby fed gravitationally into a liquid-filled holding tank. While this system eliminates the pallet boxes, the complexities of the mechanical conveyor unit diminish its acceptability as a convertible attachment for a conventional farm implement. An alternate type of food lift designed for use in a processing plant is taught by Valdespino in U.S. Pat. No. 3,918,116. It operates by aspirating fruit suspended in liquid to a higher level above the liquid surface. However, the excessive size of the aspirator and the large liquid throughput render it impractical for field and many storage handling operations.

SUMMARY OF THE INVENTION

We have now devised a fruit and vegetable handling system by which freshly picked produce is dropped into the current of a recirculating carrier liquid in a shallow flume hopper near ground level and is drawn with the current through a suction line to a liquid-containing holding tank held at reduced pressure.

It is an objective of the invention to provide a produce handling system to be used in conjunction with either manual or mechanical pickers for collecting the produce and transporting it from the field or orchard.

It is another objective of the invention to provide a simple and easily maneuverable produce handling system which can be readily installed on any conventional tractor or over-the-row power frame.

It is an additional object of the invention to provide a produce handling system for delivering field-collected produce to a liquid-filled storage facility.

It is a further object of the invention to provide a system which minimizes or eliminates bruising and other damage to the perishable produce during handling.

It is also an object of the invention to provide a handling system which can be used to surface treat or vacuum impregnate the produce during field collection and storage.

Other objects and advantages of this invention will become readily apparent from the ensuing description.

BRIEF DESCRIPTION OF THE DRAWINGS

FIG. 4 is a diagrammatic flow scheme of the field handling system.

FIG. 5 is a diagrammatic flow scheme of the storage handling system.

DETAILED DESCRIPTION OF THE INVENTION

The handling system of the instant invention is designed for use in conjunction with the harvesting of substantially all types of fruit and vegetable crops, particularly those which have customarily been field collected in pallet boxes or bulk bins. Examples of such crops, without limitation thereto, are apples, pears, peaches, nectarines, plums, citrus, cherries, blueberries, grapes, nuts, and cucumbers. In the ensuing description, these crops will generally be referred to as produce or fruits.

Figure 1:
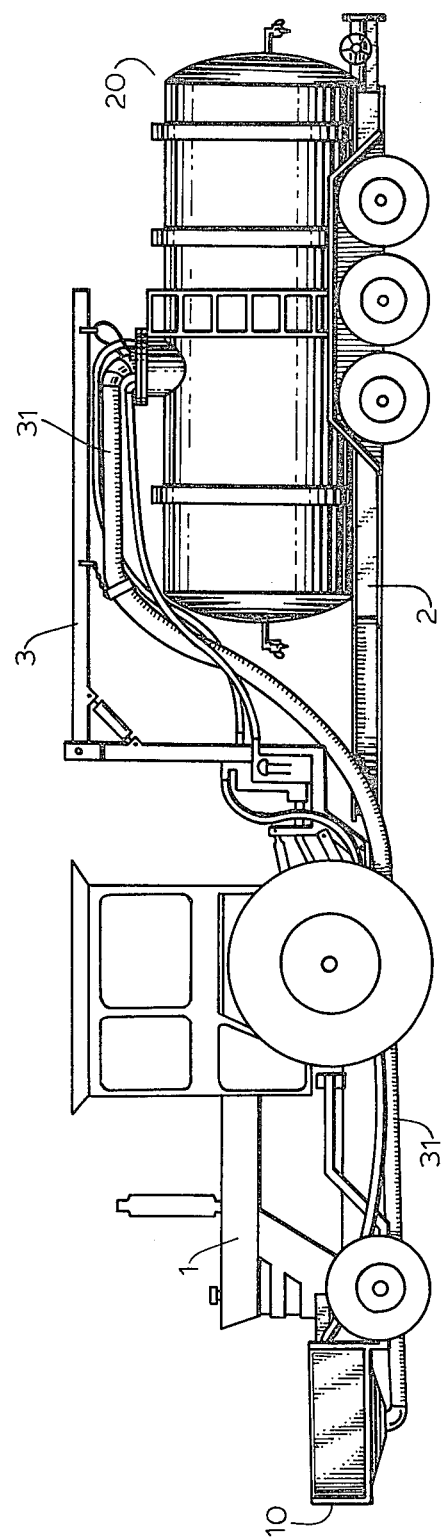
FIG. 1 is a side elevation view of the overall field handling system.

FIG. 1 illustrates the field handling system as adapted to a conventional tractor 1, and to be used in combination with a harvester. Alternatively, the system may be incorporated into the harvesting apparatus itself, such as the over-the-row power frame disclosed in U.S. Pat. No. 4,064,683, supra, herein incorporated by reference. Secured to the front of the tractor is a flume hopper 10, positioned as close to the ground as possible without hindering travel. For tree-grown fruits, the hopper should be at a level below the lowermost limbs for either catching the fruit directly or for receiving it gravitationally from catch frames or decelerating strips. In the harvesting of low-growing produce, the hopper level is selected for ready access by manual pickers or by harvester conveyors which would otherwise feed into bulk collection zones.

Figure 2:
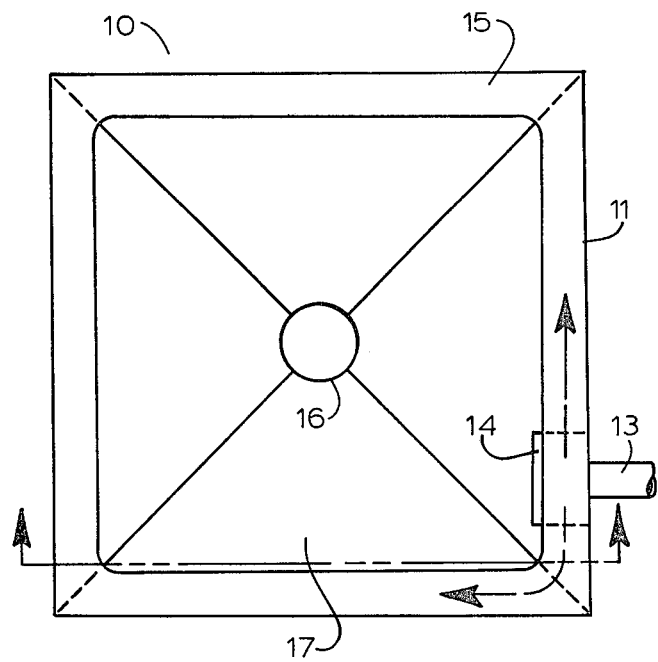
FIG. 2 is a top view of the flume hopper shown in FIG. 1.
Figure 3:
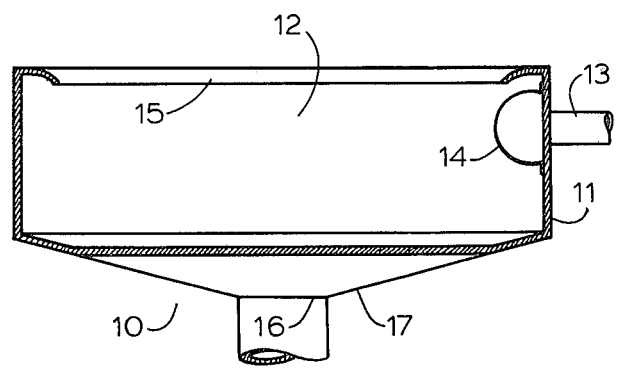
FIG. 3 is a cross-sectional view of the flume hopper shown in FIG. 2.

The design of the hopper is critical to the extent that it must permit efficient passage of the carrier liquid therethrough in order to continuously flush out the collected fruit. As shown in detail in FIGS. 2 and 3 the flume comprises side walls 11 defining an enclosure 12. One of the side walls is equipped with a liquid inlet 13 covered by an arcuate baffle 14. The interaction of the flow with the baffle causes aeration of the liquid thereby enhancing its cushioning effect on the fruit. The baffle also splits the liquid flow into two oppositely flowing streams. This tends to squelch the formation of a vortex which would otherwise inhibit the discharge of the fruit. The circulating streams and entrained produce are contained within enclosure 12 by means of perimetrical lip 15, and are eventually drawn through outlet 16 in funnel-shaped bottom wall 17. While the outlet has been illustrated in the center of bottom wall 17, it may also be positioned adjacent to a side wall at a substantially horizontal orientation in order to increase the ground clearance.

As shown in FIGS. 1 and 4, the outlet 16 feeds into hydraulic conveyor line 31 for conducting the fruit to holding tank 20. To prevent clogging, this suction line should have a diameter at least three times the mean diameter of the produce being harvested. It should also be sufficiently flexible to permit vertical displacement of the flume hopper as well as uncoupling from the holding tank 20.

The holding tank is secured to trailor 2 pulled by tractor 1. It is preferably constructed from a noncorrosive food-grade material such as aluminum, stainless steel, plastic, or fiberglass. The tank is kept partially filled with the carrier liquid 5, allowing for a sufficient headspace 6 to accommodate the volume of fruit 7 and on which to draw a vacuum. The headspace enclosed by throat 21 permits a vacuum to be pulled even after the tank has been filled to the top 22.

The conveyor line 31 empties into tank 20 through opening 23 in throat 21. When the produce being harvested has a density less than that of the carrier, the fruit is most readily distributed throughout the tank by means of vertical downdraft tube 24 and horizontal diverters 25. For high density produce relative to the liquid, the downdraft tube and diverters are omitted and the produce is introduced into the tank directly through inlet 32.

The partial vacuum in headspace 6 is created by vacuum pump 33 through line 34, and it causes the carrier and entrained fruit to be drawn from the flume hopper to the holding tank through line 31. The vacuum line 34 is equipped with a trap 35 to prevent liquid from accidentally being drawn into the pump. The relief valve 36 protects the tank from excess vacuum pressure.

The carrier liquid is recirculated from tank 20 back to flume hopper 10 by means of recirculating pump 37 and line 38. The recirculating capacity of this pump is preselected to replenish the liquid drawn from the flume by conveyor line 31, and to thereby maintain a sufficient volume of liquid therein to seal the outlet 16 and to cushion the fruit as it is dropped in. Typically, the pump should recirculate at least twice the volume of liquid as the volume of fruit fed into the flume. Inside the tank, the recirculating line 38 is connected to updraft tube 39 having a screen 40 and a foot valve 41 for holding the prime when the tube is lifted out.

Each of lines 31, 34, and 38 are secured within tank opening 23 by means of quick attachment closure member 26. Annular seal 27 fitted to the bottom of the closure member or on flange 28 insures an airtight pressure fit over tank opening 23. The seal is preferably constructed of a resilient material such as rubber or other gummy substance. Centering ring 29 facilitates proper positioning of the closure member onto the flange so as to obtain an effective seal and to insure mating of conveyor line 31 with downdraft tube 24.

As depicted in FIG. 1, the closure is hung on a boom 3 which is adapted to be raised and lowered and to pivot about the axis of its vertical leg. It is envisioned that under the proper conditions, two holding tanks could be carried behind tractor 1. When one tank became filled, the boom would serve to transfer the closure and its fittings to the other tank.

Low density produce can be readily removed from the holding tank by flotation through opening 23 with additional liquid introduced through inlet/outlet valve 43. During unloading, the fruit sometimes forms bridges in the upper part of the tank at approximately a 33° angle from the horizontal. These bridges can be broken by injecting air through nozzles 44 provided at each end of the tank. Inlet/outlet valve 43 can also be used to flush out high density fruit with liquid introduced through opening 23.

In an alternate embodiment of the invention depicted in FIG. 5, the above-described flume hopper is incorporated into a storage handling system. In this system, produce harvested from the field is delivered to flume hopper 110 whereby it is conveyed through line 131 to temporary storage facility 120. Carrier liquid 105 is recirculated to the flume by pump 137 through line 138, and a vacuum is drawn on the headspace 106 by pump 133 via line 134. The produce is removed through outlet 143. This system could of course be used in conjunction with the above-described field handling system whereby produce is flushed out of the holding tank 20 and directly into hopper 110. Fruit which has been collected in pallet boxes or bulk bins can simply be dumped into the flume 110.

In either the field or the storage handling system, the amount of vacuum needed is only slightly more than that required to compensate for the head between the liquid levels in the flume hopper and the holding tank. Such a vacuum is also sufficient to remove a substantial amount of air from the fruit, thereby permitting concurrent vacuum impregnation by the liquid medium. Suitable impregnation media would include water, brine, and aqueous solutions of calcium chloride, sucrose, pesticides, antioxidants, or other additives conventionally used to treat fruit and vegetables.

The above-described systems are simple, reliable, and virtually eliminate the damage caused by prior art handling methods. Because the fruit is being pulled through the conveyor line by vacuum, it is not subject to the problem of plugging characteristic of a pumping system. Moreover, the system has a self throttling ability to adjust for the amount of fruit being introduced. When the amount diminishes, more water is drawn through the conveyor line than the recirculating line can supply, and the vacuum is temporarily reduced.

The invention also expedites the harvesting and transportation process. A typical field-size flume hopper can convey in excess of 10 bushels of fruit per minute to the holding tanks, which can be hauled directly to storage without the cumbersome and time-consuming manipulation of pallet boxes or bulk bins.

It is understood that the foregoing detailed description is given merely by way of illustration and that modification and variations may be made therein without departing from the spirit and scope of the invention.

We claim:

1. An apparatus for handling freshly harvested produce comprising:
   a. a flume hopper having an opening in the top for receiving said produce, a liquid stream inlet, a baffle means for dividing said liquid stream into countercurrent portions and for causing aeration of said liquid, an outlet for said liquid and said produce, and at least one downwardly sloping bottom portion for directing said produce suspended in said liquid into said outlet;
   b. a sealable holding tank for said liquid and said produce;
   c. a suction line for conveying said suspended produce into said holding tank;
   d. means for recirculating said liquid from said holding tank to said flume hopper; and
   e. means for applying a sufficient vacuum to said holding tank for drawing said suspended produce from said flume hopper outlet through said suction line and into said holding tank.

2. The apparatus as described in claim 1 wherein the opening in the top of said flume hopper is surrounded by an inwardly protruding lip.

3. The apparatus as described in claim 1 wherein said downwardly sloping bottom portion of said flume hopper is funnel-shaped.

4. The apparatus as described in claim 1 and further comprising means for mobilizing said apparatus in a field.

* * * * *